United States Patent [19]
Lesage

[11] Patent Number: 5,737,800
[45] Date of Patent: Apr. 14, 1998

[54] HOT WATER BUSHING

[75] Inventor: Claude Lesage, Quebec, Canada

[73] Assignee: Giant Factories Inc., Montréal, Canada

[21] Appl. No.: 654,227

[22] Filed: May 28, 1996

[51] Int. Cl.$^6$ ........................................... F16L 5/00
[52] U.S. Cl. ........................................... 16/2
[58] Field of Search ................ 16/2, 3; 174/151, 174/152 R, 152 G, 153 R, 153 G; 217/113, 106, 108, 98

[56] References Cited

U.S. PATENT DOCUMENTS 5,455,986  10/1995  Gentile ........................... 16/2

*Primary Examiner*—Chuck Y. Mah
*Attorney, Agent, or Firm*—Swabey Ogilvy Renault

[57] ABSTRACT

A bushing for a hot water tank to connect a temperature sensing probe of a temperature controller device to the tank wall with the temperature controller device extending into the tank. The bushing is comprised of a cylindrical body having an outer connecting portion and a cylindrical inner bore portion. The temperature sensing probe is retained at a fixed position in axial extension through the inner bore portion. The inner bore portion has three equidistantly spaced-apart circumferential seal receiving channels with an O-ring seal receivable in friction fit in each of the channels. A central one of the O-rings provides a pivot for the probe and a substantially leak-proof seal about a cylindrical body portion of the temperature sensing probe. An outer and inner one of the O-rings resist to opposing load forces created by the load of the temperature controller device secured to an outer end of the temperature sensing probe, and equilibrates this load about the central O-ring.

7 Claims, 2 Drawing Sheets

HOT WATER BUSHING

TECHNICAL FIELD

The present invention relates to a bushing for a hot water tank for connecting an exterior device associated with the tank and requiring access to the interior of the tank through a bushing secured to the inner tank wall. Such devices may consist of a temperature sensing probe of a temperature controller having a probe extending inside the tank through the stub-nose bushing of the present invention and wherein a cylindrical body portion of the probe is supported by three equidistantly spaced O-ring seals with a central one of the seals providing a substantially leak-proof seal about the cylindrical body portion.

BACKGROUND ART

Coupling bushings for connecting exterior devices associated with hot water tanks, such as a temperature controller device and wherein a temperature sensing probe extends within the tank to sense the temperature of the water, are known. However, there are a few disadvantages associated with such bushings in that they often develop exterior and interior leaks. We have found that interior leaks are developed by the load that the temperature controller device places on the outer end of the cylindrical portion of the probe which is retained between a pair of O-ring seals provided in the bushing. The weight of the controller device causes, over time, deformation of the O-rings causing one of the O-rings to compress in one direction and the other spaced O-ring to compress in an opposed direction. By compressing the rings in only opposed portions thereof, the uncompressed portions are, in at least areas which are diametrically opposed to the compression forces, in loose friction contact with the cylindrical portion of the probe and any water pressure applied in those areas will eventually leak through the rings between the uncompressed portions of each seal and the probe.

Another disadvantage is that due to the size of these bushings, they can only be secured to the threaded bore of the inner tank wall after the outer tank casing has been installed. Because insulation is disposed between the inner and outer casings often when installing such bushings some of the insulation fibers lodge themselves between the outer connecting threads of the bushing and the threaded bore in the inner tank wall. Over time, this also can develop leakage.

SUMMARY OF INVENTION

It is a feature of the present invention to provide a bushing for a hot water tank for connecting exterior devices, such as a temperature sensing probe of a temperature controller device to a wall of the tank with the probe extending therein, and which bushing substantially overcomes the above-mentioned disadvantage of the prior art.

Another feature of the present invention is to provide an improved bushing for a hot water tank for connecting an exterior device, such as a temperature sensing probe of a temperature controller device and wherein the bushing is provided with three equidistantly spaced O-ring seals in a cylindrical inner bore portion thereof.

Another feature of the present invention is to provide a sub-nose bushing which is secured to the inner tank wall of a hot water heater prior to assembly of the insulation and outer tank wall.

According to the above features, from a broad aspect, the present invention provides a bushing for a hot water tank for connecting an exterior device associated with the hot water tank and having a probe requiring access to the interior of the inner tank through the bushing. The bushing is comprised of a cylindrical body having an outer circumferential connecting portion, a stub-nose outer end, and a cylindrical inner bore portion. Lock means is provided to retain the probe at a fixed position in axial extension through the inner bore portion. The inner bore portion has three equidistantly spaced-apart circumferential seal receiving channels. An O-ring seal is receivable in friction fit within a respective one of the channels. A central one of the O-rings provides a pivot for the probe and a substantially leak-proof seal about the cylindrical body portion of the temperature sensing probe while an outer and inner one of the O-rings resist to opposing load forces created by the exterior device secured to an outer end of the temperature sensing probe, and equilibrates the load about the central O-ring.

BRIEF DESCRIPTION OF DRAWINGS

A preferred embodiment of the present invention will now be described with reference to the accompanying drawings in which.

DESCRIPTION OF PREFERRED EMBODIMENTS

Figure 3:
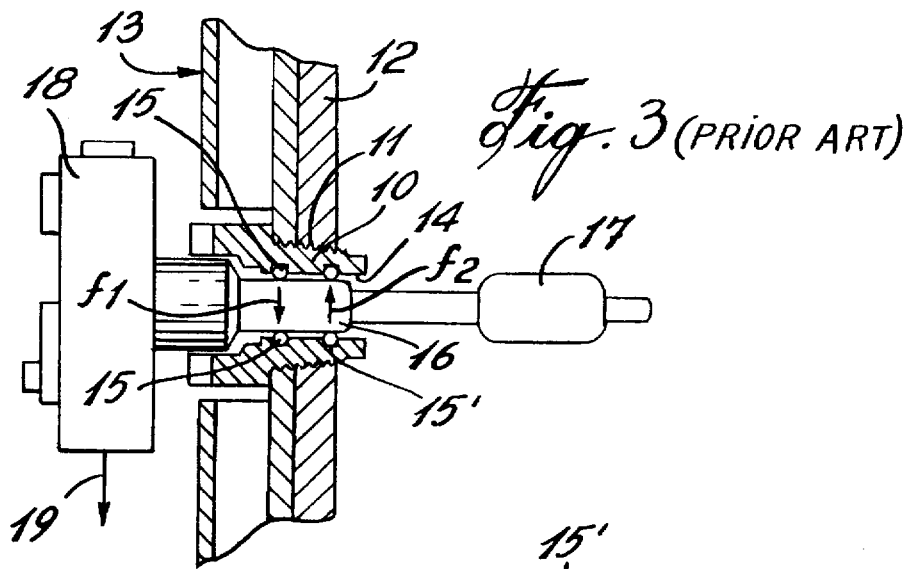
FIG. 3 is a simplified fragmented view showing a temperature sensing probe and controller device connected to a hot water tank wall through a bushing constructed in accordance with the prior art.
Figure 4:
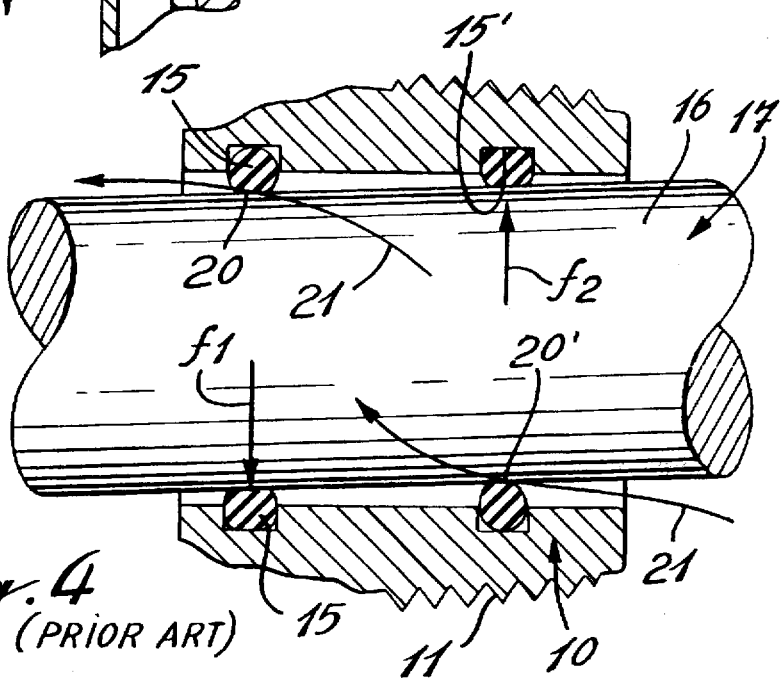
FIG. 4 is an enlarged fragmented view showing the bushing of the prior art and its seals whereby to illustrate the leakage problem.

Referring now to the drawings, and more particularly to FIGS. 3 and 4, there is shown generally at 10, a bushing constructed in accordance with the prior art. The bushing has a connecting portion 11 having an outer thread portion 11' secured within the inner wall 12 of a hot water tank 13. A large connecting outer end portion 9 extends out of the outer wall 12' of the tank 13. Insulation 8 is interposed between the inner and outer walls 12 and 12'. The bushing has a cylindrical inner bore portion 14 provided with a pair of O-ring seals 15 and 15'. A cylindrical body portion 16 of a temperature sensing probe 17 is retained captive between the pair of O-ring seals 15 and 15'. A temperature controller device 18 is secured to an outer end of the temperature sensing probe 17.

As can be seen from FIGS. 3 and 4, the load illustrated by arrow 19 resulting from the weight of the controller device 18 and further loads applied by manipulation by service technicians, creates downward forces $f_1$ on the outer O-ring seal 15 and an opposed upward force $f_2$ on the inner one of the O-ring seals 15'. This causes the O-ring seal 15 to compress in a lower portion of the ring, as better seen in FIG. 4, while the diametrically opposed portion of the O-ring becomes in loose friction fit with the cylindrical body portion 16 of the probe 17. Similarly, the force $f_2$ acting upwardly on the inner O-ring seal 15' is a diametrically opposed force and causes the ring 15' to compress in that region and to become in loose friction fit in the diametrically opposed region as illustrated at 20 and 20' respectively for the O-ring 15 and 15'. Because the water in the hot water tank in the area of the probe is under a certain amount of pressure, this will, in many cases, eventually cause a leak to develop in the weak friction areas 20 and 20' between the seals and the probe, as illustrated by arrows 21. The bushing 30 of the present invention resolves this problem.

Another problem with these bushings 10 is that they can only be installed after the tank walls and insulation is assembled. Therefore, when the bushing 10 is installed through a hole 7 in the outer casing 12', insulation 8 is often lodged between the outer threads 11' of the bushing and the inner basing bore hole 6. This may also develop leakage.

Figure 1:
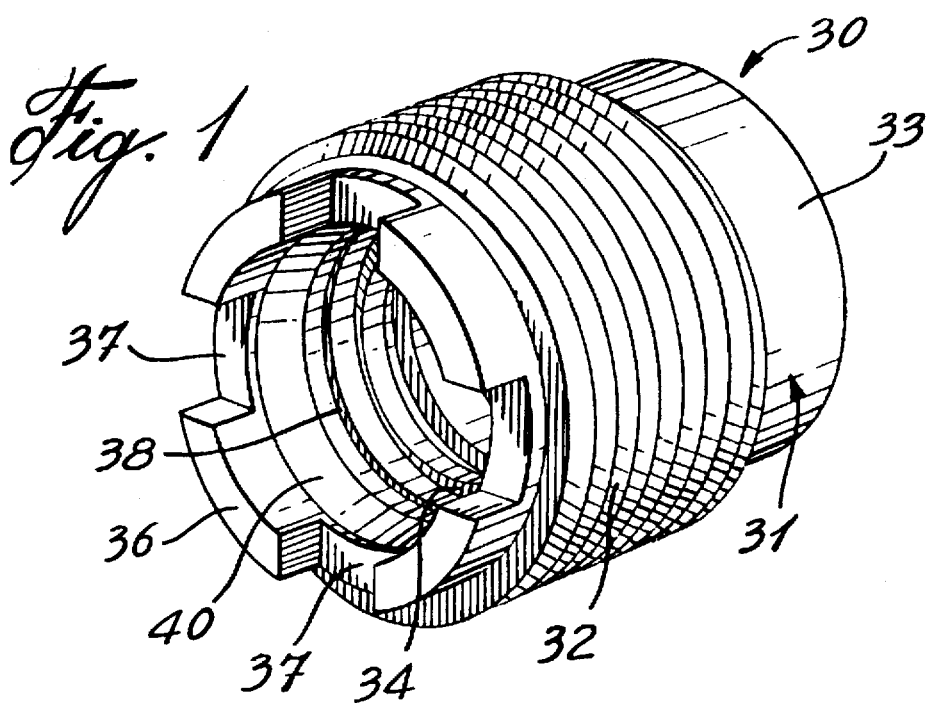
FIG. 1 is a perspective view of the bushing of the present invention.
Figure 2:
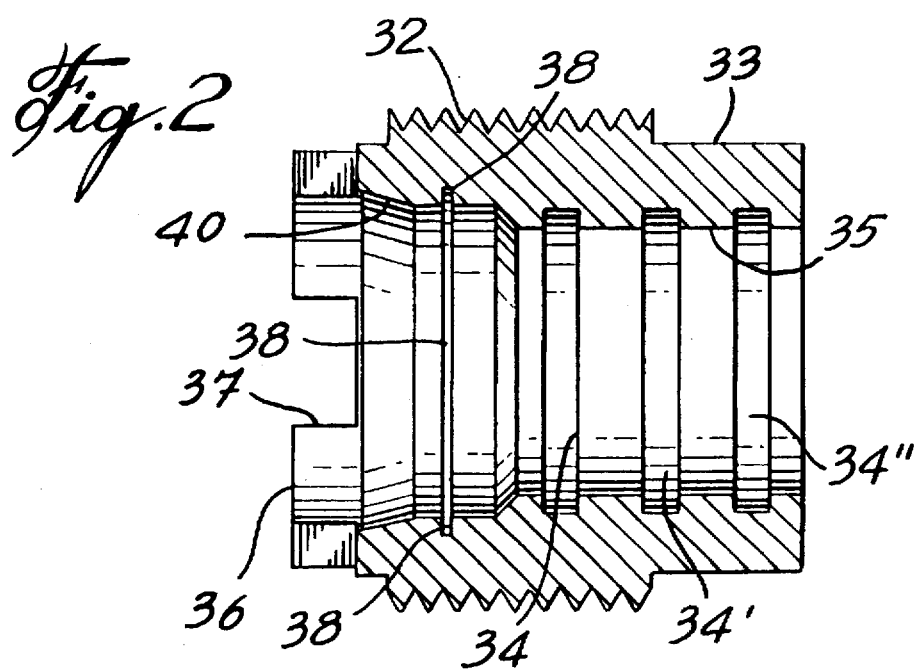
FIG. 2 is a longitudinal section view of the bushing as shown in FIG. 1.
Figure 5:
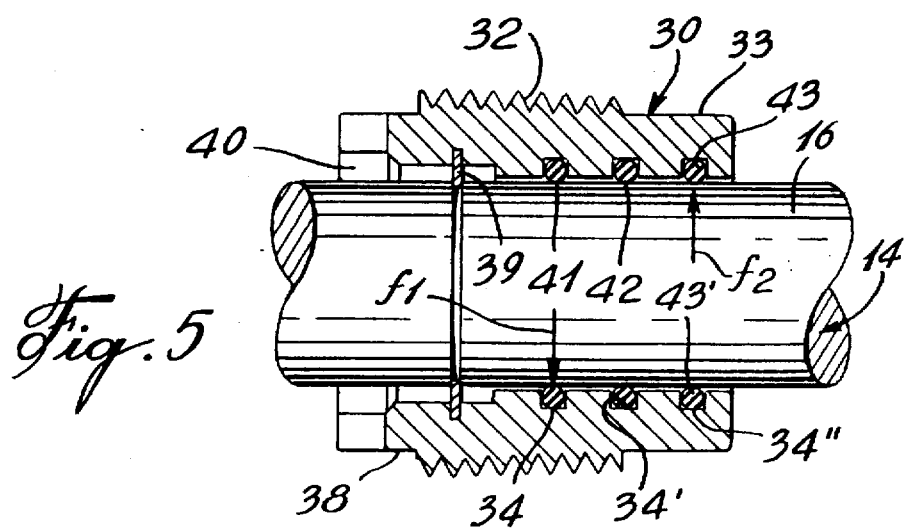
FIG. 5 is a simplified section view showing the cylindrical body portion of the probe passing through the bushing of the present invention.

Referring now to FIGS. 1, 2 and 5, it can be seen that the bushing 30 of the present invention is comprised of a cylindrical steel body 31 which has an outer connecting tapping thread portion 32 to secure the bushing within a hole formed in the inner wall 12 of the hot water tank 13. The cylindrical body also has a cylindrical inner extension portion 33 to permit the location of three equidistantly spaced apart O-ring receiving channels 34 in an inner cylindrical bore portion 35 thereof. The outer end of the bushing has a stub-nose formed as a positioner ring portion 36 having locating grooves 37. The stub-nose extends a short distance out of the inner tank wall 12 to permit its pre-assembly prior to assembly of the tank. The stub-nose extension is less than the spacing between the inner and outer tank walls. Accordingly, insulation cannot lodge itself in the threads 32 as there is no insulation over the inner tank at that stage of construction. This also speeds up assembly of the tank.

The inner bore portion 35 is also provided with a cylindrical slot 38 to receive therein a lock ring 39 to attach the cylindrical body portion 16 of the probe to the bushing. The outer end portion of the inner cylindrical bore 35 is of larger diameter, as shown at 40, to permit locking and unlocking engagement of the probe and its temperature controller device with the bushing 30.

As shown in FIG. 5, there are three O-rings, herein O-rings 41, 42 and 43, received in friction fit within each of the O-ring channels 34, 34' and 34". As previously described, the downward force 19 exerted on the temperature sensing probe due to the weight of the temperature controller device, and other external forces applied to the device, applies a downward force $f_1$ on the outer O-ring 41 and an upward force $f_2$ on the inner O-ring 43. Because the intermediate O-ring 42 is equidistantly spaced from the inner and outer O-ring, these forces $f_1$ and $f_2$ equilibrate the load on the central O-ring and accordingly this central ring is not deformed as is the inner and outer O-rings and acts as a central pivot ring having a substantially uniform sealing pressure about the cylindrical portion 16 of the probe and providing a substantially leak-proof seal about the cylindrical portion 16. Accordingly, if water was to infiltrate through the lower portion 43' of the inner ring 43, that water would be arrested by the central O-ring and not go any further. There is thus provided a substantially leak-proof support for the probe. The result is that there is less maintenance to replace the O-ring seals and, therefore, less shut-downs of the hot water supply and this of course results in a reduction in operating costs.

It is within the ambit of the present invention to cover any obvious modifications of the preferred embodiment described herein. For example, it is foreseen that the outer connecting thread portion 32 may be replaced by a different type of connector, such as a bayonet type with a sealed connecting ring secured to the tank wall, not shown, but obvious to a person skilled in the art. It is also intended to cover substitute materials for the O-rings or the bushing provided such fulfill the objects of the present invention. Various other types of exterior devices may also be connected to such bushings, such as safety valves or drain valves, etc.

I claim:

1. A bushing for a hot water tank for connecting exterior devices associated with said tank and requiring access to an interior thereof through said bushing secured to an interior wall of said tank, said bushing being comprised of a cylindrical body having an outer circumferential connecting portion, a stub-nose outer end, and a cylindrical inner bore portion, lock means to retain a probe of an exterior device at a fixed position in axial extension through said inner bore portion, said inner bore portion having three equidistantly spaced-apart circumferential awl receiving channels, and O-ring seals each of which is receivable in friction fit within a respective one of said channels, a central one of said O-ring scale providing a pivot for said probe and a substantially leak-proof seal about a cylindrical body portion of said probe while an outer and inner one of said O-ring seals resist to opposing lead forces created by said exterior device secured to an outer end of said probe, said outer and inner O-ring seals also equilibrate the load about said central O-ring seals.

2. A bushing as claimed in claim 1 wherein said cylindrical body stub-nose outer end is formed as an outer positioner ring portion formed integral with said bushing for mating engagement with said exterior device which is a temperature controller device.

3. A bushing as claimed in claim 1 wherein said outer connecting portion is a tapered cylindrical threaded portion tapering in diameter from an outer end of said connecting portion to an inner end thereof.

4. A bushing as claimed in claim 1 wherein said O-ring seals are spaced-apart a distance of at least 1.5 times the cross-sectional diameter of said O-rings.

5. A bushing as claimed in claim 1 wherein said bushing is a steel bushing for use with gas-fired water heaters.

6. A bushing as claimed in claim 1 wherein said cylindrical body has an inner extension body portion to accommodate said three seal receiving channels.

7. A bushing as claimed in claim 1 in combination with a hot water tank comprised of an inner casing and an outer casing secured thereabout and defining therebetween a space, said bushing being secured to said inner casing, said stub-nose outer end portion being dimensioned to extend out of said inner casing a distance which is less than said space between said inner casing and said outer casing.

* * * * *